US007422188B1

(12) United States Patent
Schlosser

(10) Patent No.: US 7,422,188 B1

(45) Date of Patent: Sep. 9, 2008

(54) WALKING CANE CLAMP

(76) Inventor: Harold L. Schlosser, 1710 Gayfields Dr., Silver Spring, MD (US) 20906

( * ) Notice: Subject to any disclaimer, the term of this patent is extended or adjusted under 35 U.S.C. 154(b) by 0 days.

(21) Appl. No.: 11/520,194

(22) Filed: Sep. 13, 2006

(51) Int. Cl.
*A01K 97/10* (2006.01)

(52) U.S. Cl. ...................................... 248/535; 224/407

(58) Field of Classification Search ................. 248/682, 248/687, 689, 693, 518, 534, 535, 539, 205.2, 248/218.4, 229.17, 316.5, 229.23, 228.4, 248/230.4; 135/65; D3/10; 224/148.6, 247, 224/251, 463, 572, 401, 570
See application file for complete search history.

(56) References Cited

U.S. PATENT DOCUMENTS

| | | | | |
|---|---|---|---|---|
| 488,522 | A * | 12/1892 | Jones | 24/15 |
| 2,913,797 | A * | 11/1959 | Hollis et al. | 24/481 |
| 4,300,742 | A | 11/1981 | Hunn | |
| 4,334,692 | A * | 6/1982 | Lynch | 224/274 |
| 4,741,283 | A * | 5/1988 | Conner | 114/230.3 |
| 4,895,330 | A | 1/1990 | Anstead | |
| 4,896,465 | A * | 1/1990 | Rhodes et al. | 451/523 |
| 5,000,418 | A * | 3/1991 | Vogt | 248/689 |
| 5,249,770 | A * | 10/1993 | Louthan | 248/311.2 |
| 5,295,498 | A | 3/1994 | Van Meter et al. | |
| 5,316,356 | A * | 5/1994 | Nutting | 294/118 |
| 5,857,651 | A * | 1/1999 | Kunevicius | 248/230.8 |
| D418,286 | S | 1/2000 | Skeppstedt | |
| 6,138,976 | A * | 10/2000 | Fahringer, Sr. | 248/518 |
| 6,311,942 | B1 | 11/2001 | Rotter et al. | |
| 6,502,283 | B1 * | 1/2003 | Aguirre | 24/3.11 |
| 6,691,722 | B2 | 2/2004 | Hutchinson et al. | |
| 6,971,612 | B1 * | 12/2005 | Wilson-Lowery | 248/104 |
| 7,021,324 | B1 * | 4/2006 | Clay et al. | 135/67 |
| 2002/0152669 | A1 * | 10/2002 | Harvanek et al. | 43/21.2 |
| 2004/0020524 | A1 * | 2/2004 | McConnell | 135/66 |
| 2005/0098695 | A1 * | 5/2005 | Hollenbeck | 248/229.26 |
| 2006/0226315 | A1 * | 10/2006 | Beasley et al. | 248/229.13 |

* cited by examiner

*Primary Examiner*—Brian Glessner
*Assistant Examiner*—Bradley H Duckworth
(74) *Attorney, Agent, or Firm*—T.L. Garrett, PLC; Tanya L. Garrett

(57) ABSTRACT

The present area of technology provides a device that may releasably hold an elongated cylindrical object such as a walking cane, a crutch, or a pole in a fixed position. The device is removably attached to the walking cane itself by a pair of elongated straps and provides positive clamping means to hold the cane against a stationary structure. The device has a handle that opens the clamp, which is inserted onto a planar structure to firmly hold a walking cane in position. In one aspect of the technology, the device is suitable for use with walking canes of various diameters. The technology also provides a coating to aid in the retention of the walking cane and to prevent slippage of the walking cane while the cane is disposed through a cylindrical portion of the cane holder.

3 Claims, 7 Drawing Sheets

WALKING CANE CLAMP

FIELD OF THE INVENTION

The present invention generally relates to a device for releasably securing a cane, a crutch, a pole or other elongated cylindrical device that may exist or may come into existence in a fixed position.

BACKGROUND

Portable cane holders have consisted of devices that are attached to a cane and rely on the cane's center of gravity and balance to keep the cane in a secure position when held at the edge of a support such as a table. Examples of different types of cane holders can be found in U.S. Pat. No. D418,286 issued to Skeppstedt, U.S. Pat. No. 5,295,498 issued to issued to Van Meter, U.S. Pat. No. 4,895,330 issued to Anstead, U.S. Pat. No. 4,300,742 issued to Hunn, U.S. Pat. No. 6,311,7942 issued to Rotter, and U.S. Pat. No. 6,691,722 issued to Hutchinson. While these existing devices suit their intended purposes, the need remains for a device and method that provides for releaseably holding an elongated cylindrical device, a cane or a crutch in a fixed position.

SUMMARY

The present area of technology is directed to a device that may releasably hold a walking cane, a crutch, a pole, or other elongated cylindrical device that may exist or may come into existence in a fixed position. The device is removably attached to the walking cane itself, and provides positive clamping means by which the walking cane is held in a secure position against the edge of a table, the edge of a desk, the leg of a chair, or a similar structure. The cane holder remains on the walking cane during use and transport. When it is desired that the walking cane be secured to a structure, the clamp is removed from the walking cane and removably clamped to the structure. A pair of clamping straps are releasably bound together around the circumference of the walking cane so that the cane is held securely. Alternatively, the clamp may remain attached to the walking cane and the clamping straps are bound together around the leg of a table or a chair.

DETAILED DESCRIPTION OF THE INVENTION

The present invention provides a clamping device to temporarily hold a walking cane in an easy-to-reach position for the walking cane owner. The device may have a clamping feature similar to that of a clothespin. A set of clamping jaws may be connected in an offset transverse manner to the clamping mechanism. When closed, the cane clamping jaws have a circular cutout that is sized to encircle a cane diameter and two substantially parallel walls that protrude out from the circular cutout and that are adapted to clamp to the edge of a table, the edge of a desk, the leg of a chair, or other suitable structure. The clamping device may be made of any rigid material such as metal or plastic. Rubber covers may be included to provide a more effective gripping surface and to protect both the surface of the cane and the surface of any structure to which the device may be clamped, such as a table or a desk.

The appealing features of the device are the convenience of the clamp, its ease of use, and its functional utility for providing ready access to a walking cane when its owner is seated nearby.

Figure 1:
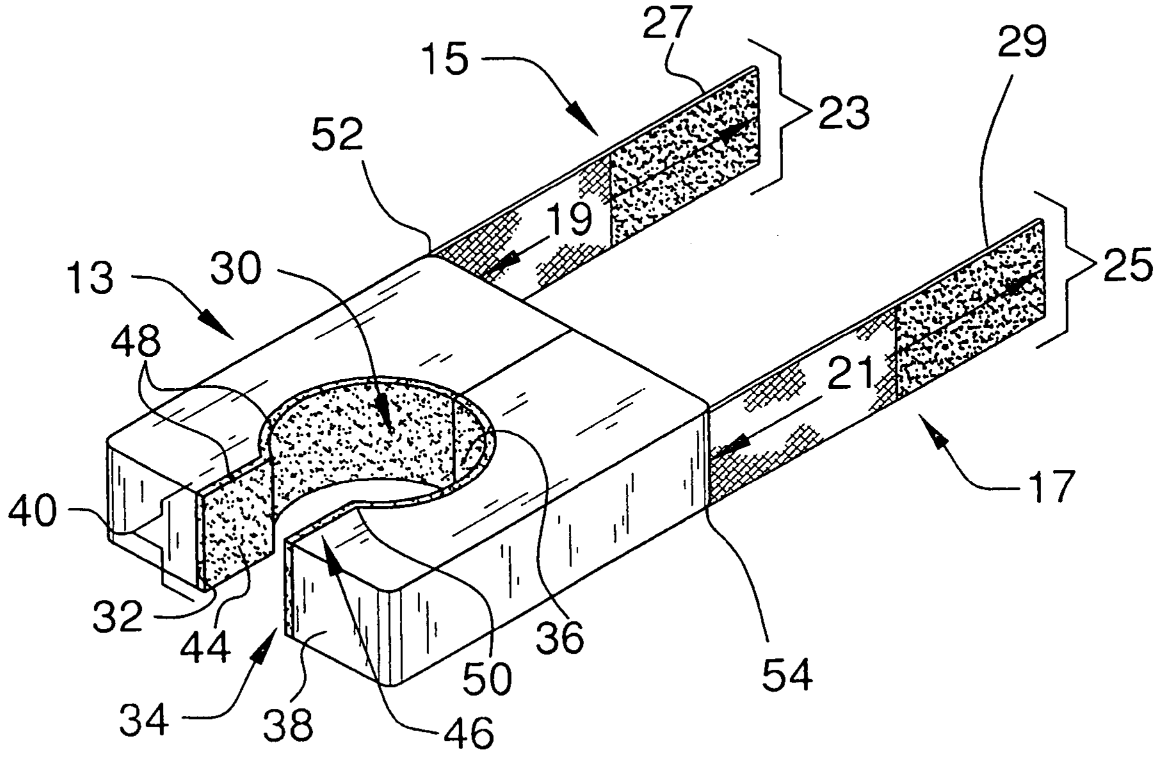
FIG. 1 is a perspective view of a cane holder according to one aspect of the present invention.

Now referring to the drawings as shown in FIG. 1, The device is defined as a cane holder 10 having a base 12 and a pair of elongated flexible straps 14, 16 each strap having a predefined length 18, 20; a uniform width 22, 24; and a uniform thickness 26, 28.

Figure 2:
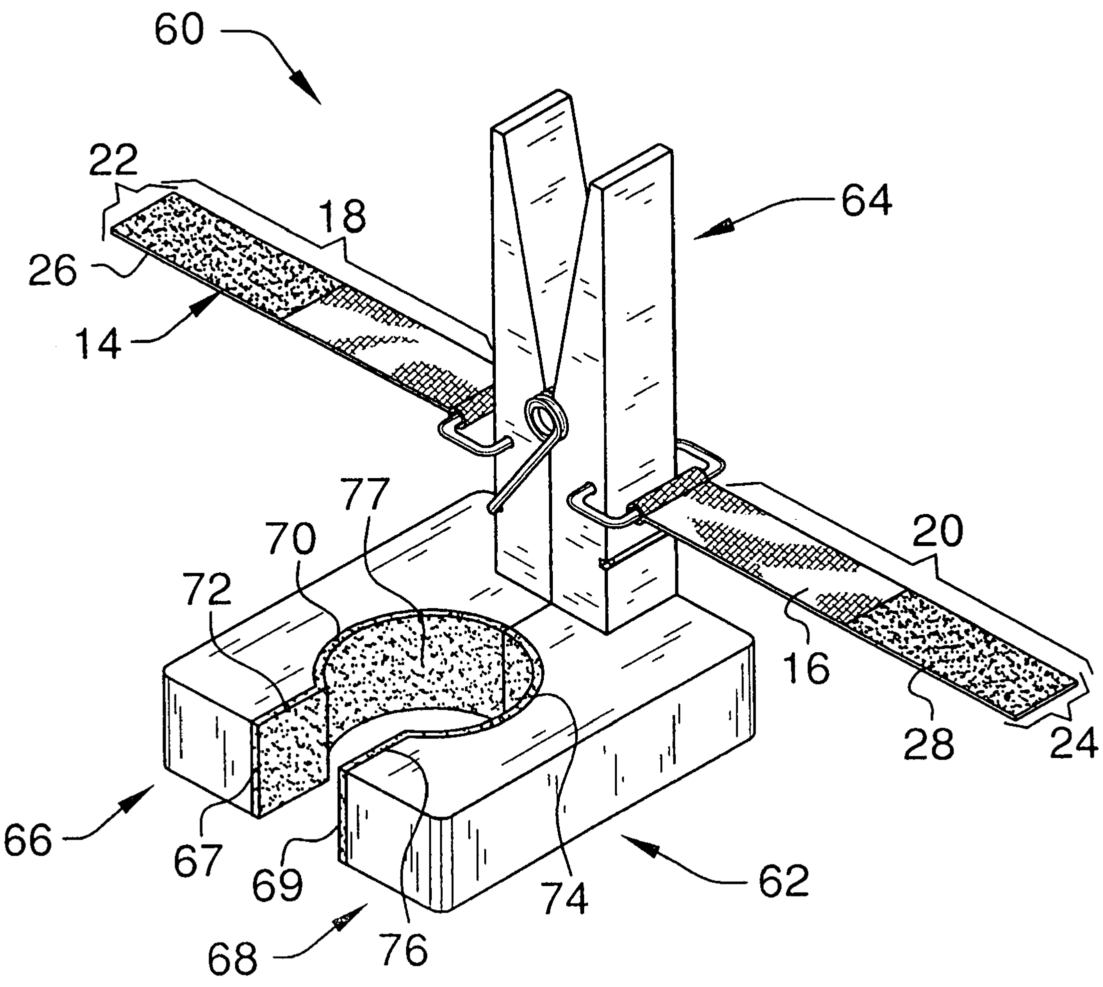
FIG. 2 is a front perspective view of the cane holder according to another aspect of the present invention.
Figure 3:
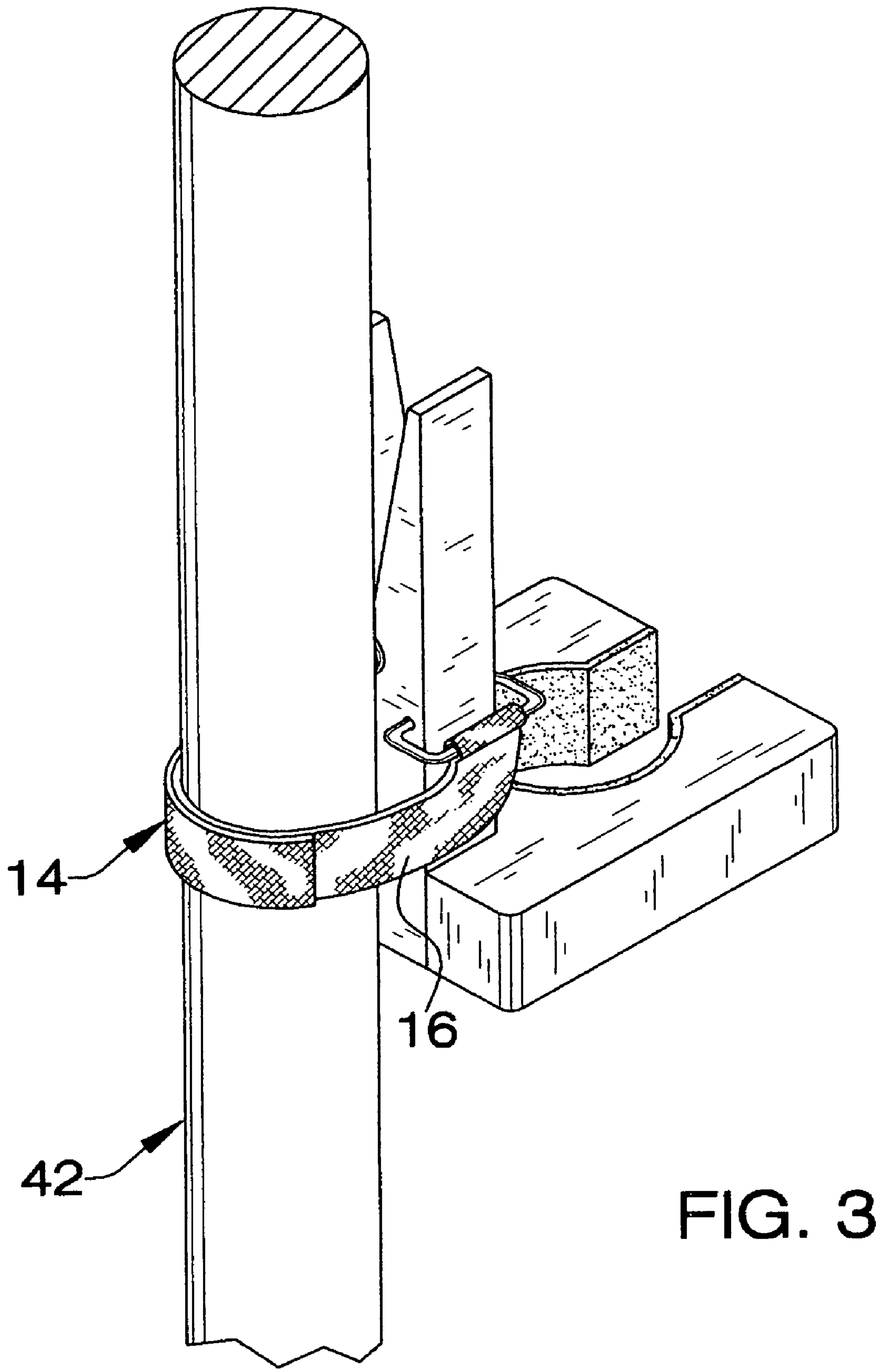
FIG. 3 is a back perspective view of the cane holder shown in FIG. 2 releasably attached to a cane according to an aspect of the present invention.

In an alternative embodiment of the invention, as shown in FIG. 2, the cane holder 60 may be generally “L” shaped and have a separable base that forms a “C” shaped clamp 62, a handle 64, and a pair of elongated flexible straps that cooperate together to attach and release the cane holder from platforms with opposing spaced apart walls of varying widths such as but not limited to a platform, an edge of a table or a desk, or an other substantially uniform object with opposing spaced apart walls and having a width of less than a predefined distance.

The separable base 62 includes a first member 66 and a second member 68 that cooperate together to form a “C” shaped clamp 62. The first member 66 may have a first interior wall 67 having an arcuate portion 70 and a planar portion 72. The second member 68 may have a second interior wall 69 that compliments the first interior wall 67 of the first member and also has an arcuate portion 74 and a planar portion 76. The first interior wall 67 of the first member mates with and cooperates with the second interior wall 69 of the second member to form a “C” shaped clamp 62. The “C” shaped clamp 62 having a first planar end portion 72, a second planar end portion 76, and a cylindrical portion 77.

The first planar end portion 72 and the second planar end portion 76 of the “C” shaped clamp form spaced apart parallel planar walls that extend outwardly in a radial direction from the cylindrical portion a predefined distance to form an opening in the cylindrical portion of the base. The opening ranges from a minimum distance to a maximum distance between the first planar end portion and the second planar end portion and is adapted to releasably attach to a platform or other substantially uniform object that has a width less than the maximum distance between first planar end portion and the second planar end portion. Alternatively, the “C” shaped clamp 62 is adapted to receive and secure an elongated cylindrically shaped device such as a cane.

Figure 4:
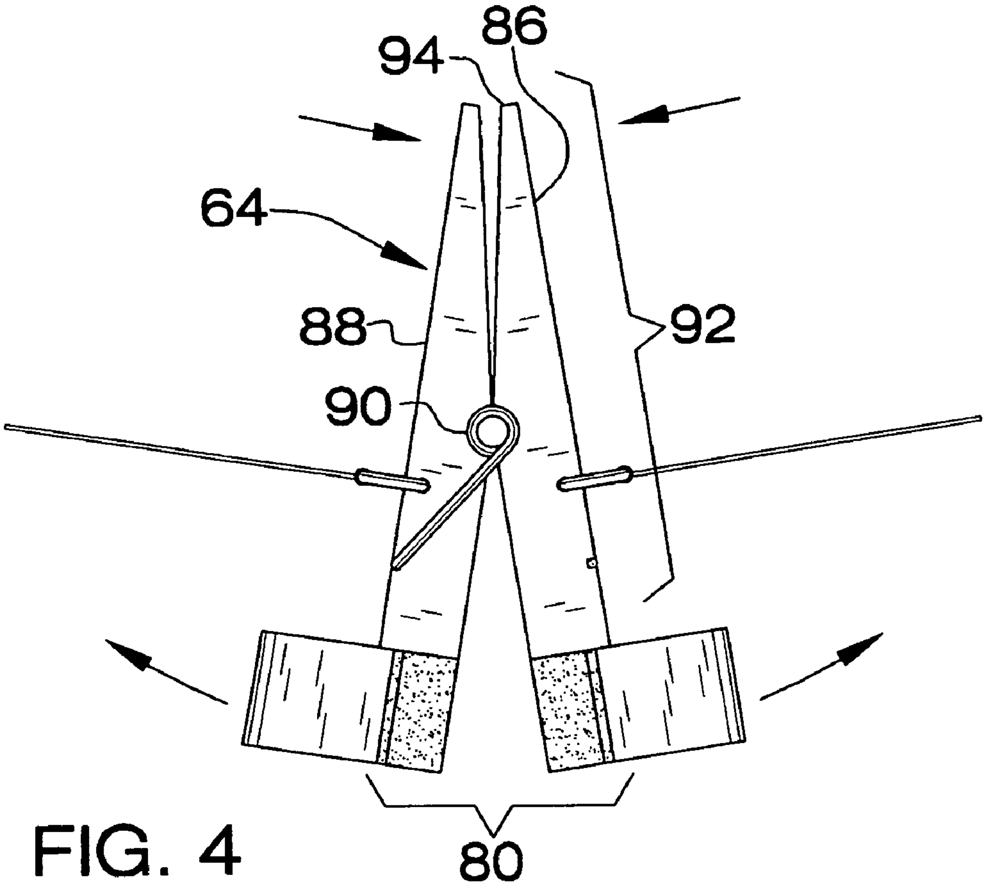
FIG. 4 is a backside view of the cane holder shown in FIG. 2 in an open position.
Figure 5:
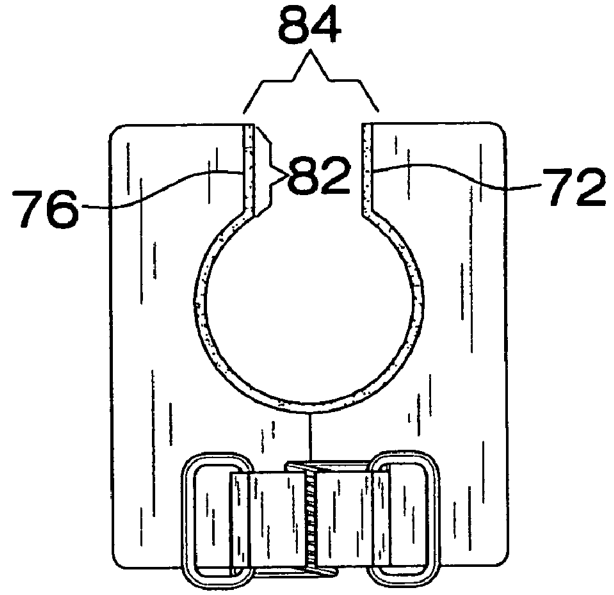
FIG. 5 is a top side view of the cane holder shown in FIG. 2.
Figure 6:
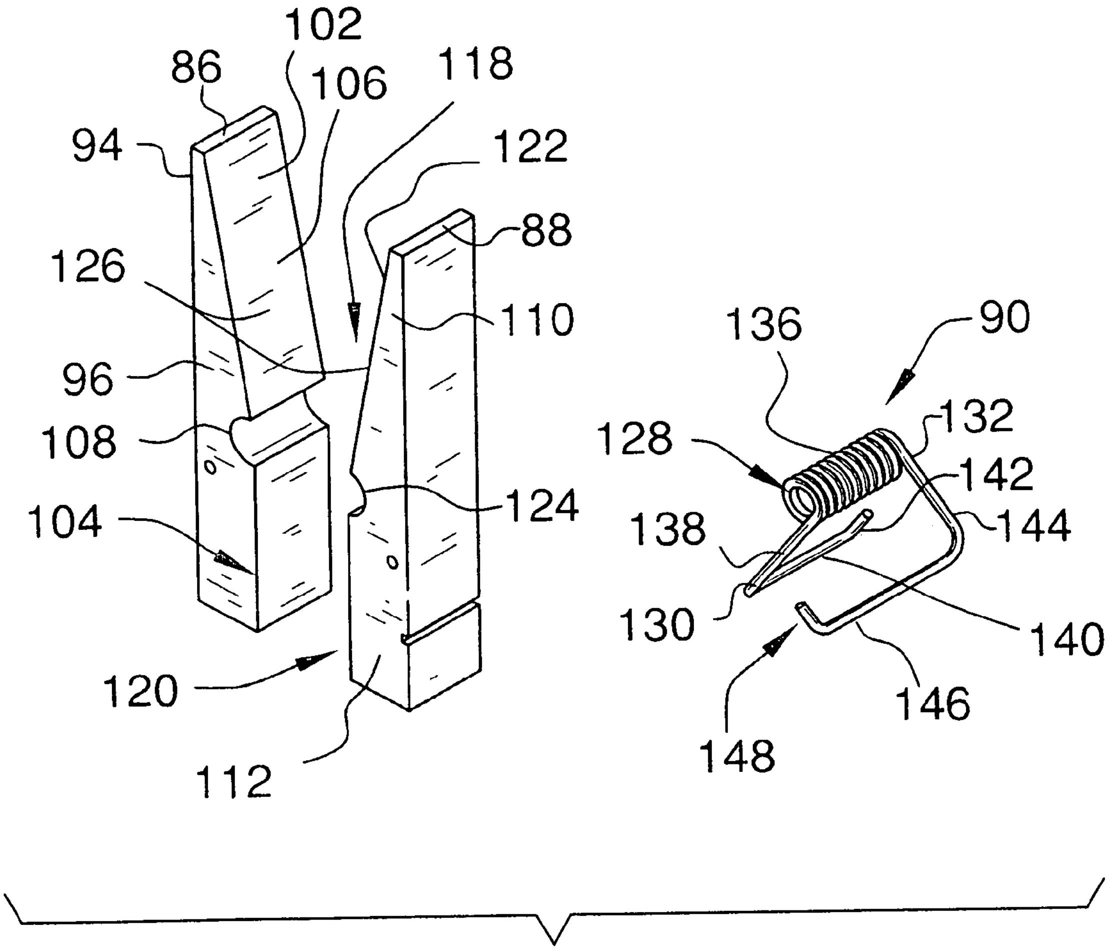
FIG. 6 is an exploded view of the handle for the cane holder shown in FIG. 2.

As shown in FIG. 4, the handle 64 has a first arm 86, a second arm 88, and a spring 90 that cooperate with each other to open and close the “C” shaped clamp. The first arm 86 of the handle is integrally formed with the first member of the base with the first member 66 of the base at a substantially 90-degree angle such that the first arm 86 of the handle is co-planar with the longitudinal axis of an elongated cylindrically shaped device when the base of the cane holder is removably attached to the elongated cylindrically shaped device. The corresponding second arm 88 of the handle is integrally formed with the second member 68 of the base at a 90-degree angle such that the second arm 88 of the handle is co-planar with the longitudinal axis of an elongated cylindrically shaped device when the base of the cane holder is removably attached to the elongated cylindrically shaped device.

The first and second arms 86, 88 of the handle each have an associated outer end 94, 110 respectively. Each of the first and second arms 86, 88 respectively extend a predefined distance from the first and second members respectively of the base to each of the associated first and second arm outer ends 94, 110. In an embodiment of the invention, the first and second arms 86, 88 of the handle each have opposing first and second lateral surfaces 96, 98, 112, 114 and includes a third surface 100, 116 extending between the respectively opposing lateral surfaces and a fourth outer surface 102, 118 opposing the third surface 100, 116 and disposed between the opposing first and second lateral surfaces 96, 98, 112, 114. The fourth outer surface 102, 118 of the first and second arms respectively each have an associated first planar portion 104, 120 parallel to the third surface 100, 116 having a predefined length and an associated second planar 106, 122 portion extending at a predefined dihedral angle 108, 124 from the associated first planar portion 104, 120 respectively to the associated third surface 100, 116.

The fourth outer surface first planar portions 104, 120 associated with the first and second arms 86, 88 respectively each mate at an angle 126 with each of the fourth outer surface second planar portions 106, 122.

The spring 80 operates as a biasing member between the first arm 86 and the second arm 88 to bias the "C" shaped clamp to grip a platform or other substantially uniform object with opposing spaced apart walls.

Figure 7:
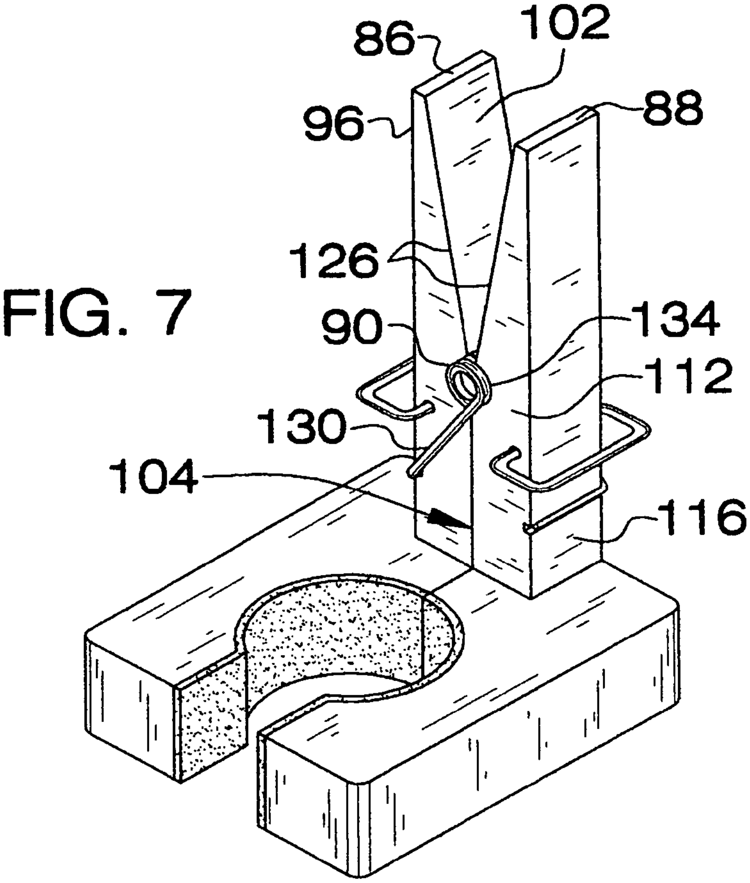
FIG. 7 is a perspective view of the cane holder shown in FIG. 2.
Figure 8:
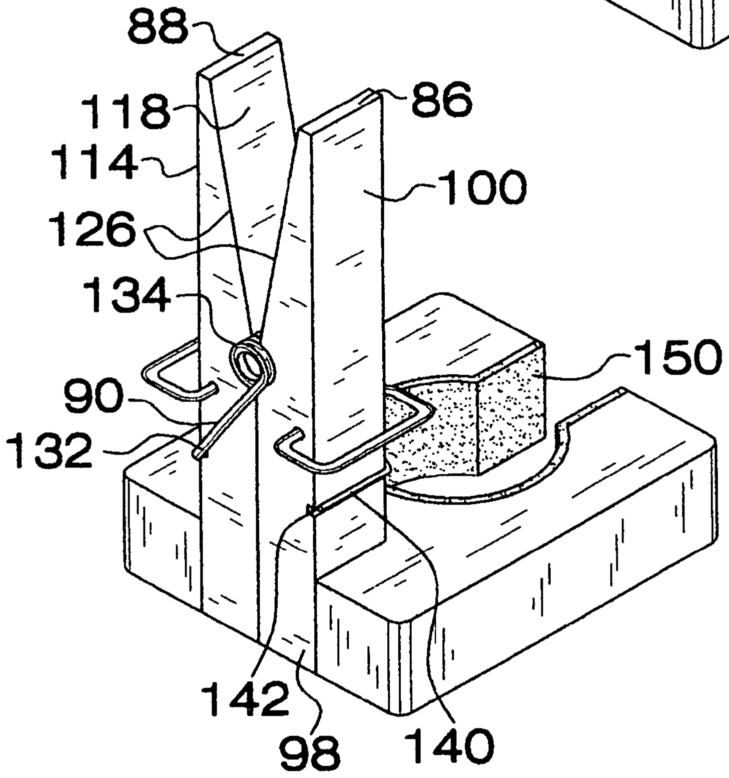
FIG. 8 is a back perspective view of the cane holder shown in FIG. 2.
Figure 9:
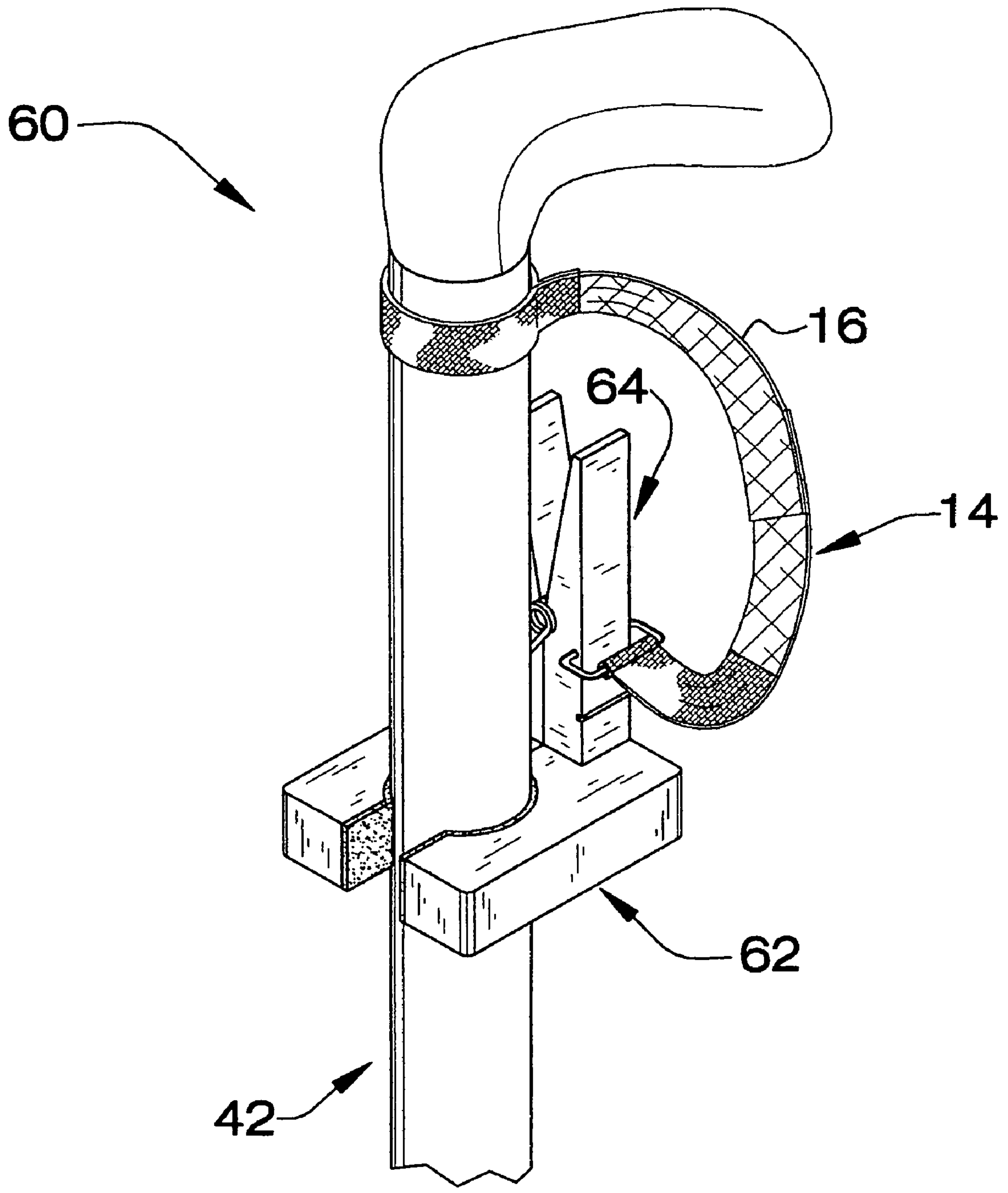
FIG. 9 is a is a perspective view of the cane holder shown in FIG. 2 releasably attached to a cane according to an alternative aspect of the present invention.

In an embodiment of the invention as shown in FIG. 7, the spring may have a coiled portion 128, a first clip 130, and a second clip 132 that cooperate together to hold the first arm 86 of the handle to the second arm 88 of the handle and to bias the "C" shaped clamp. The coiled portion has a uniform predefined diameter 134 and a predefined length 136 that may be equal to the width of the first arm fourth outer surface of the handle. The first clip 130 is at the first end of the coiled portion, and the second clip 132 is at an opposing second end of the coiled portion.

The first and second clips 130, 132 of the spring are generally "L" shaped and each include an associated first linear element 138, 144 an associated second linear element 140, 146 parallel to the coiled portion and formed at a substantially 90 degree angle to each of the first elements respectively, and an associated third linear element 142, 148 parallel to the first element 138, 144 and formed at a substantially 90 degree angle to each of the second elements respectively 140, 146.

The coiled portion 128 of the spring extends across the respective width of both the first and second arms 102, 118 along the dihedral angle 108, 124 formed between the fourth outer surfaces associated with the first and second arm first planar portions respectively. The first linear elements associated with the first and second clips respectively extend across an associated top of the first lateral surfaces associated with the first and second arms respectively to a predefined location on the associated third linear elements of the first and second clips respectively. The second linear element extends across the top of the associated third surfaces of the first and second arms respectively to a predefined location on the second lateral surfaces 96 112. The third linear element 142 extends across a top of the associated second surfaces of the first and second arms respectively a predefined distance.

As shown in FIG. 4, the elongated flexible straps 14, 16 may be permanently attached at predefined locations P1, P2 on the respective first arm 86 and second arm 88 by clips or by other means that have or may come into existence.

In another embodiment of the invention, the separable base may be adapted to releasably attach to walking canes of varying diameter. The handle and the base cooperate together to permit the use of the cane holder with walking canes of different diameter ranging from a predefined minimum diameter to a predefined maximum diameter.

The diameter of the cylindrical portion is at a minimum when the clamp is closed so that the first end and the second end mate together and the "C" shaped clamp encircles an elongated cylindrically shaped device. The internal diameter is at a maximum when the "C" shaped clamp is open such that there is a maximum distance between the first and second end portions.

The spring of the handle operates as a biasing member between the first arm and the second arm to bias the "C" shaped clamp to grip an elongated cylindrically shaped device when the "C" shaped clamp encircles the elongated cylindrically shaped device. The spring may have a coiled portion, a first clip, and a second clip that cooperate together to hold the first arm of the handle to the second arm of the handle and bias the "C" shaped clamp.

In another embodiment of the technology as shown in FIG. 1, the base may be a "C" shaped clamp having a cylindrical portion 30, a first open end portion 32 and a corresponding second open end portion 34. The cylindrical portion 30 has an internal surface 36 and an external surface 38. The cylindrical portion 30 has a predefined width 40 and an internal circumference adapted to encircle and retain an elongated cylindrically shaped device having a circumference less than that of the circumference of the cylindrical portion. The first open end portion 32 and the second open end portion 34 of the base have corresponding planar parallel surfaces 44, 46 that are spaced apart and form respective predefined angles 48, 50 with respect to the interior surface of the cylindrical portion. The cylindrical portion 30, the first end portion 32, and the second end portion 34 cooperate with each other to form the "C" shaped clamp that may firmly grasp a cane or other elongated cylindrically shaped device that may exist or come into existence.

The flexible straps 14, 16 may be permanently attached to the exterior surface of the base at predefined points 52, 54 by clips or other attachment means that may exist or may come into existence. Each strap having a predefined length 18, 20 and a predefined uniform width 22, 24. The straps 14, 16 are flexible to fit snugly around the leg of a table, the leg of a chair, or some other stationary object 42 that could support an elongated cylindrical device in a fixed position. The straps may be flexible in order to fit around stationary objects of various sizes and shapes while holding an elongated cylindrical device firmly in place. Each flexible strap 14, 16 may be detachably fastened to the other strap by a fastener such as snaps, or hook and loop, or other fastening means that may exist or may come into existence. Alternatively, the flexible straps may be adapted to attach to the elongated cylindrical device.

In another embodiment of the technology as shown in FIG. 7, a coating 150 such as rubber or latex may be provided to cover the cylindrical portion of the base to aid in the retention of a cane or another elongated cylindrical device that exists or may come into existence disposed therethrough and to prevent slippage of the cane within the base.

A method of using the cane holder is also provided. In operation, the first outer end of the first arm of the handle and the second outer end of the second arm of the handle may be compressed together to move the arms transversely from a first position to a second position. The base opens in a complementary manner to the handle from the predefined minimum diameter to the predefined maximum diameter. The flexible straps attached at predefined points on the base may be fitted around stationary objects of various sizes and shapes while the base holds a walking cane, a crutch, or other elongated cylindrical device that may exist or may come into existence firmly in place. Each flexible strap may be detachably fastened to the other strap by a fastener such as snaps, or hook and loop, or other fastening means that may exist or may come into existence.

Alternatively in operation, the flexible straps may be fitted around and detachably fastened to the walking cane while the base grasps a table, a desk, or other substantially uniform object with opposing spaced apart walls and having a width less than the maximum distance between first planar end portion and the second planar end portion.

What is claimed is:

1. A method of using a cane holder comprising:

providing a cane holder having a separable base having an arcuate portion that releaseably grasps a cane, a handle having a pair of arms, the pair of arms having a first arm, a second arm, a spring, wherein the spring acts as a biasing member between the pair of arms to bias the base to grip a cane when the base encircles the cane, and a pair of elongated flexible straps permanently attached to the base;

compressing the first arm of the handle and the second arm of the handle together;

inserting a cane securely in the cane holder;

decompressing the handle by releasing the first arm and the second arm;

wrapping the flexible straps of the cane holder around a stationary object; and fastening one of the flexible straps to the other one of the flexible straps to hold the cane holder and the cane securely in a fixed position.

2. The method of using a cane holder of claim 1 comprising:

unfastening one of the flexible straps from the other one of the flexible straps; and unwrapping the flexible straps of the cane holder from around an stationary object to remove the cane holder and the cane from the stationary object.

3. The method of using a cane holder of claim 1 comprising:

unfastening one of the flexible straps from the other one of the flexible straps;

unwrapping the flexible straps of the cane holder from around a stationary object to remove the cane holder and the cane from the stationary object;

compressing the first arm of the handle and the second arm of the handle together;

removing the cane from the cane holder; and decompressing the handle by releasing the first arm and the second arm.

* * * * *